(12) United States Patent
Kriews et al.

(10) Patent No.: US 11,077,923 B2
(45) Date of Patent: Aug. 3, 2021

(54) WATERCRAFT AND METHOD FOR OPERATING THE WATERCRAFT

(71) Applicant: SIEMENS AKTIENGESELLSCHAFT, Munich (DE)

(72) Inventors: Thorben Kriews, Hamburg (DE); Kay Tigges, Hohenfelde (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 0 days.

(21) Appl. No.: 16/097,351

(22) PCT Filed: Feb. 20, 2017

(86) PCT No.: PCT/EP2017/053792
§ 371 (c)(1),
(2) Date: Oct. 29, 2018

(87) PCT Pub. No.: WO2017/186374
PCT Pub. Date: Nov. 2, 2017

(65) Prior Publication Data
US 2019/0135387 A1    May 9, 2019

(30) Foreign Application Priority Data
Apr. 29, 2016    (DE) .......................... 102016207419.9

(51) Int. Cl.
*B63G 8/36* (2006.01)
*B63G 8/08* (2006.01)
(Continued)

(52) U.S. Cl.
CPC ................ *B63B 43/00* (2013.01); *B63G 8/08* (2013.01); *B63G 8/36* (2013.01); *B63H 21/17* (2013.01);
(Continued)

(58) Field of Classification Search
CPC . B63B 43/00; B63B 2755/00; B63B 2702/04; B63B 2035/006; B63B 32/00;
(Continued)

(56) References Cited

U.S. PATENT DOCUMENTS

2002/0024594 A1*  2/2002  Yamamuro ............ H04N 7/185
                                                348/81
2004/0069251 A1   4/2004  Rzadki
(Continued)

FOREIGN PATENT DOCUMENTS

DE    4029443    5/1991
DE    69126321   4/1998
(Continued)

OTHER PUBLICATIONS

Fuel Cell Power Systems For Autonomous Underwater Vehicle: State Of The Art; by Alejandro Mendez, Teresa j. Leo, and Miguel A. Herreros, Published Mar. 18, 2014 (Year: 2014).*
(Continued)

*Primary Examiner* — Anthony D Wiest
(74) *Attorney, Agent, or Firm* — Cozen O'Connor

(57) ABSTRACT

A watercraft and method for operating the watercraft, wherein the watercraft includes an electrical system that is present in a space that has an atmosphere that differs from air, where the space is formable by a pressure hull, where the atmosphere contains, for example, an inert gas, and where the space having the electrical system is filled with the atmosphere.

11 Claims, 2 Drawing Sheets

(51) Int. Cl.
  *B63B 43/00* (2006.01)
  *B63J 2/06* (2006.01)
  *B63H 21/17* (2006.01)
  *B63B 35/00* (2020.01)
  *B63G 8/00* (2006.01)
  *B63H 21/20* (2006.01)

(52) U.S. Cl.
  CPC ........... *B63J 2/06* (2013.01); *B63B 2035/006* (2013.01); *B63G 2008/002* (2013.01); *B63H 2021/202* (2013.01); *Y02T 70/50* (2013.01); *Y02T 70/5218* (2013.01); *Y02T 70/5236* (2013.01); *Y02T 90/40* (2013.01)

(58) Field of Classification Search
  CPC ......... B63B 32/87; B63B 34/00; B63B 34/10; B63B 34/15; B63B 34/30; B63B 34/45; B63B 34/565; B63B 34/70; B63B 34/75; B63G 8/36; B63G 8/08; B63G 2008/002; B63H 21/17; B63H 2021/202; B63H 8/23; B63H 8/24; B63H 8/25; B63H 8/50; B63H 8/70; B63J 2/06; Y02T 90/46; Y02T 70/5209; Y02T 70/5218; Y02T 70/5236; E04H 4/0006; A63B 69/0093
  See application file for complete search history.

(56) References Cited

U.S. PATENT DOCUMENTS

| | | | |
|---|---|---|---|
| 2006/0156744 A1* | 7/2006 | Cusiter | B63B 35/00 62/50.2 |
| 2007/0242134 A1 | 10/2007 | Zernov | |
| 2013/0002065 A1 | 1/2013 | Kawashima et al. | |
| 2013/0233392 A1* | 9/2013 | Aarseth | B63B 25/12 137/1 |
| 2016/0254556 A1 | 9/2016 | Zhang et al. | |

FOREIGN PATENT DOCUMENTS

| | | |
|---|---|---|
| EP | 1354387 | 10/2003 |
| GB | 685675 | 1/1953 |
| GB | 1027678 | 4/1966 |
| KR | 20060113399 | 11/2006 |
| KR | 20140139145 | 12/2014 |
| KR | 20150001748 | 5/2015 |
| WO | WO2009/026964 | 3/2009 |
| WO | WO2015/163769 | 10/2015 |

OTHER PUBLICATIONS

"Cargo conditioning, reliquefaction and boil-off control requirement for a liquefied gas carrier", retrieved from the internet on Jun. 3, 2020 at "http://www.liquefiedgascarrier.com/cargo-conditioning.html". Screen captures as early as Jun. 6, 2011. (Year: 2011).*

Psoma et al., "Fuel Cell Systems for Submarines: from the first idea to serial production", Journal of Power Sources, Elsevier SA; vol. 106, No. 1-2, pp. 381-383; ISSN: 0378-7753; DOI: 10.1016/s0378-7753(01)01044-8; XP004348713; 2002.

PCT International Search Report and Written Opinion of International Searching Authority dated May 26, 2017 corresponding to PCT International Application No. PCT/EP2017/053792 filed Feb. 20, 2017.

* cited by examiner

WATERCRAFT AND METHOD FOR OPERATING THE WATERCRAFT

CROSS-REFERENCE TO RELATED APPLICATIONS

This is a U.S. national stage of application No. PCT/EP2017/053792 filed Feb. 20, 2017. Priority is claimed on German Application No. 102016207419 filed Apr. 29, 2016, the content of which is incorporated herein by reference in its entirety.

BACKGROUND OF THE INVENTION

1. Field of the Invention

The invention relates to a watercraft and a method for operating the watercraft.

2. Description of the Related Art

Watercrafts are ships or submarines (U-boats), for instance. Examples of ships are cargo ships, tankers, container ships, passenger ships, speedboats, patrol boats, minesweepers, etc. Examples of submarines are nuclear submarines, research submarines, hunting submarines, rescue submarines, repair submarines, unmanned underwater vehicles (UUV), where these may be, e.g., these remote-controlled submersibles or also autonomous submersibles.

EP 1 354 387 B1 discloses an energy system for a watercraft, in particular for ships or submarines, for instance. These watercrafts of varying types and shapes are typically driven with fixed propellers, adjustable propellers, rudder propellers and occasionally also water jetting systems. Here, the mechanical energy for the drive is produced directly by combustion engines, such as Otto engines, diesel engines with heavy or light oil operation or gas turbines. Fossil fuels that are stored in tanks carried along by the watercraft are used as energy carriers. In such cases, the combustion engines on board watercraft are not only used for the drive but, instead, also to produce electrical energy for a plurality of electrical loads on board watercraft, such as for auxiliary drives which, in turn, convert electrical energy into mechanical energy, electrical devices for generating heat, cold and light, electrical devices for media technology and electrical devices for nautical science. Here, the combustion engines are coupled to electrical machines, which convert the mechanical energy output by the combustion engines into electrical energy for the electrical loads. The energy system for the watercraft can also have a battery and/or a fuel cell, via which at least one electrical drive and at least one electrical load can be supplied with electrical energy by way of a supply network, where the electrical drive is an alternating current drive, for instance, which can be connected to a direct current network of the supply network by way of at least one inverter unit.

For electrical devices, such as an electric motor, a switch, or a lamp, guidelines exist with regards to hazardous areas. These may include fire hazardous and explosive areas of zones 1 and 2, for instance. The devices are to be formed in accordance with a degree of protection or standard, as a function of the protection to be achieved.

Watercrafts are used self-sufficiently. Consequently, a high level of reliability is required. It is also advantageous to realize a simple and cost-effective construction of watercrafts.

SUMMARY OF THE INVENTION

An object of the invention is therefore to increase the safety of watercraft, or to simplify their design.

This and other objects and advantages are achieved in accordance with the invention by a watercraft or with a method, where the watercraft has an electrical system, where an electrical system is present in a space, and where the space has an atmosphere that is different from air.

The electrical system has at least one electrical device or a plurality of electrical devices. Examples of electrical devices are electrical motors, electrical generators, current converters, switches, switching systems, or gates. Devices of this type are also used in an energy system for the watercraft, for instance. For instance, the energy for the watercraft comes from a battery, a fuel cell, from the combustion of a medium that contains hydrocarbon, such as natural gas, or crude oil. With watercraft (under and over water), in many cases (particularly) electrical components, in other words in particular electrical devices, are configured with specific protection classes such that, on the one hand, they are protected against unwanted touching by personnel and, on the other hand, in the event of a fault they are protected mutually and among one another. If the electrical components and devices of an electrical system are disposed in a space with an atmosphere that is different than air, the protection of individual components can be reduced. Therefore the housing for individual electrical components can be formed more easily with a reduced classification, for instance. If a component is disposed in the space with the atmosphere that is different than air, it is possible to dispense with a separate encapsulation of the respective individual component, for instance. Encapsulation may possibly no longer be necessary, or now only a partial encapsulation. The protection class can therefore also be reduced. This can also result in a reduced mounting volume of the electrical system. Components were previously individually (partially) encapsulated and provided with adequate protection classes such that, e.g., in the event of an arcing, no damage can occur to other component parts or persons.

In order to increase safety, hazardous electrical systems can be spatially separated from a crew's quarter.

By positioning electrical components, such as electrical devices, in a space with a special atmosphere, individual (electrical) components can be configured more easily and in a less encapsulated manner, because the risk of, e.g., fires is much lower or can be ruled out. This can then be achieved, for instance, if the atmosphere is inert gas, or oxygen 02 is extracted from the atmosphere.

With the space in which the atmosphere is disposed, a number of components or hazardous component parts can therefore be protected at the same time. Fire alarm systems and an evacuation (vacuum) of the entire system/space of air, which has oxygen 02, can also provide for increased safety. This is also achieved by filling the space with a non-conducting liquid, such as oil or distilled water.

In one embodiment of the watercraft, the space is formed by a pressurized vessel. The pressurized vessel is a hollow body, with which during operation a difference between the internal pressure and the external pressure occurs. Underwater vehicles have pressurized vessels. The entire underwater vehicle can also be filled with the atmosphere, for instance.

In another embodiment of the watercraft, the atmosphere is a low-reaction gas or gas mixture, or the atmosphere has a low-reaction gas or gas mixture. With unmanned overwater and underwater vehicles, care need not be taken to ensure that a breathable atmosphere prevails, at least not during operation.

These vehicles can therefore be filled with a substance that prevents unwanted reactions (combustion, corrosion, . . . ). This can occur via an inert gas, for instance, with which the entire vehicle will be or is filled. The vehicle or at least the space with the electrical system is therefore filled with a substance or an atmosphere, which inhibits or prevents a reaction with the environment. This can occur via various gases (inert gas, noble gas, nitrogen, hydrogen, natural gas, CO2, . . . ). If necessary, the available space can be increased for propellant and the service life on sea can therefore additionally be increased. Gases that are very inert are referred to as inert gases. They therefore take part in only a few chemical reactions. Nitrogen and all noble gases (helium, neon, argon, krypton, xenon, radon) are included in the inert gases.

In a further embodiment of the watercraft, the atmosphere has a power fuel. The power fuel is natural gas, for instance. Alternatively to an inert gas as the atmosphere, a gaseous power fuel can therefore also form the atmosphere. In such cases, consumed power fuel can also be replaced by a further gas (e.g., nitrogen from an accumulator carried along), such that no explosive atmosphere results. A further example of a gas as a power fuel is hydrogen gas H2, which can be used in a fuel cell, for instance.

In yet another embodiment of the watercraft, the space has an overpressure. On account of the overpressure, the immersion depth of an underwater vehicle can be increased, for instance. For instance, with the design of the vehicle, care can be taken to ensure that the internal pressure is always higher than the external pressure. The design can therefore be configured similarly to pressure cylinders (P internal>>P external).

In an embodiment of the watercraft, this is predominantly or entirely flushed with the atmosphere. If the interior of the watercraft therefore only has oxygen, for instance, a risk of explosion by the air oxygen is no longer given. This procedure is particularly suitable during the use of unmanned vehicles.

In another embodiment of the watercraft, the electrical system has a current converter, an electrical motor and/or a current distribution network. These components or devices are required particularly for an electrical drive of the vehicle, which can therefore be realized in a highly fail-safe manner.

In an embodiment of the watercraft, the watercraft is a submarine, which is in particular unmanned. The unmanned water vehicle (UUV) can be used, for instance, for the repair of valves in natural oil sources, for the repair of pipelines or for clearing mines.

It is also an object of the invention to provide a method for operating a watercraft, where a space with an electrical system is filled with an atmosphere. The atmosphere has in particular an inert gas or an inert gas mixture.

With the method, one of the described embodiments of the watercrafts is used in particular. Here, in particular in the space or in the watercraft, a pressure greater than the air pressure is produced.

In an embodiment of the method, a gaseous motor fuel, such as natural gas or hydrogen, is used wholly or partially as atmosphere.

In accordance with a further embodiment of the method, the space and/or the watercraft is cleared of all people before being filled with the atmosphere. This produces in particular an unmanned watercraft, such as for instance a UUV, which can be remote-controlled or is also autonomous.

In a further embodiment of the method, the pressure is set as a function of an immersion depth. The higher the pressure in the filled atmosphere, where the space is formed by the pressurized vessel, the greater the maximum immersion depth.

In yet another embodiment of the method, the pressure is set as a function of an immersion depth. The higher the pressure, the more power fuel can be carried along in the watercraft, thereby increasing its range. A greater immersion depth can also be achieved via a higher pressure in the atmosphere.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described by way of example below with reference to exemplary embodiments, in which.

DETAILED DESCRIPTION OF THE EXEMPLARY EMBODIMENTS

Figure 1:
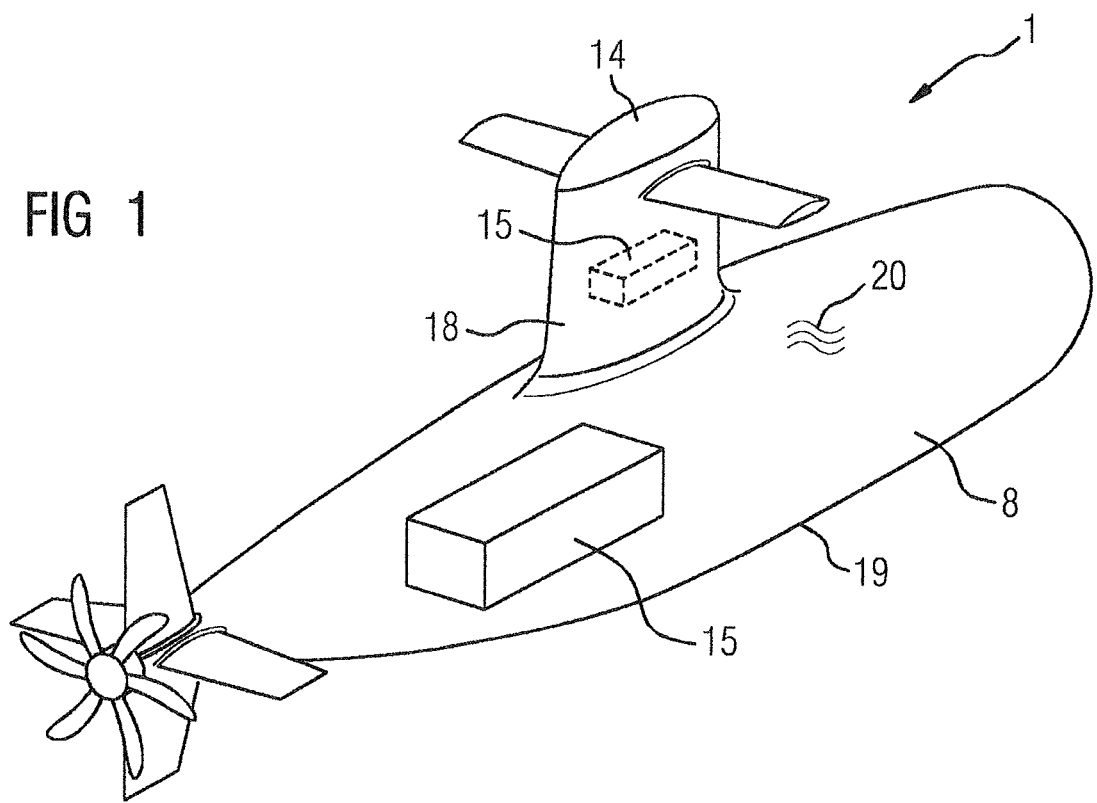
FIG. 1 an unmanned under water vehicle.

The diagram according to FIG. 1 shows a submarine 1 as an example of a watercraft. The submarine has a technical system 15. As components, the technical system 15 has, for example, an electric motor, a current converter, a battery, a fuel cell and/or a mains supply, where these elements are not shown in FIG. 1. The electrical system 15 is disposed in a space 8. The electrical system 15 can also be disposed entirely or partially in a space 18 of a tower 14 of the submarine 1. The space 8 or 18 has an atmosphere 20, which is different from air and is symbolized with three sinuous lines. The atmosphere 20 has predominantly a low-reaction gas or a low-reaction gas mixture or consists of the same. The space 8 is formed by a pressurized vessel 19. A simpler, more reliable operation of the electrical system 15 is possible via the special atmosphere 20. The pressurized vessel 19 separates the inner space 8 of the underwater vehicle 1 from the surrounding water masses.

Figure 2:
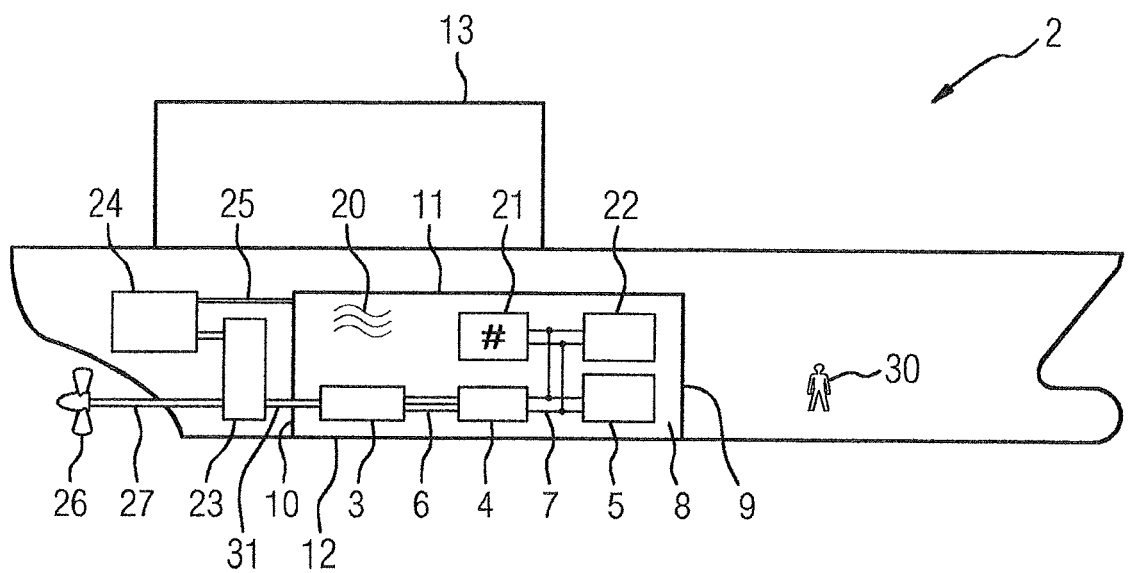
FIG. 2 a ship as a watercraft.

The diagram of FIG. 2 shows a ship 2 as an example of a watercraft. The ship 2 has superstructures 13. The ship 2 can be driven by way of a propeller 26, which is connected to a transmission 23 by way of a shaft 27. An internal combustion engine 24 that is supplied with fuel by way of a fuel pipe 25 is connected to the transmission 23. The transmission 23 is also connected to an electrical machine 3 by way of a shaft 31. The ship has a space 8 irrespective of the type of drive with or without a propeller or with or without a transmission or with or without an internal combustion engine 24, such as a diesel engine. The space 8 is bounded by side walls 9 and 10, a ceiling 11 and a floor 12. The space 8 is accessible by a person 30. If an atmosphere 20, such as predominantly nitrogen as a low-reaction gas with few or no oxygen portions, is disposed in the space 8, the space 8 is cleared of all people 30. At least one part of the drive train of the ship 2 is disposed in the space 8. The drive train has the electrical motor 3. The electrical motor 3 can also be operated with a generator, for instance. The electrical motor 3 is powered by a current converter 4 by way of a three-phase electrical connection 6. The current converter 4 receives its electrical energy by way of a two-phase DC bus 7, for instance. A battery 5, a fuel cell 22 and a distribution network 21 is connected to this two-phase DC bus 7. The distribution network 21, the fuel cell 22, the battery 5, the DC bus 7, the current converter 4 and/or the motor 3 are a technical system individually and/or in combination. This technical system is disposed in the atmosphere 20, which has little or no oxygen 02. In one embodiment, the atmosphere is a motor fuel such as natural gas or hydrogen, for instance. Natural gas can be fed as power fuel to the internal combustion engine 25 by way of the fuel pipe 25. Hydrogen H2 as a reaction gas in the fuel cell 22 can alternatively be used as an alternative energy store.

Figure 3:
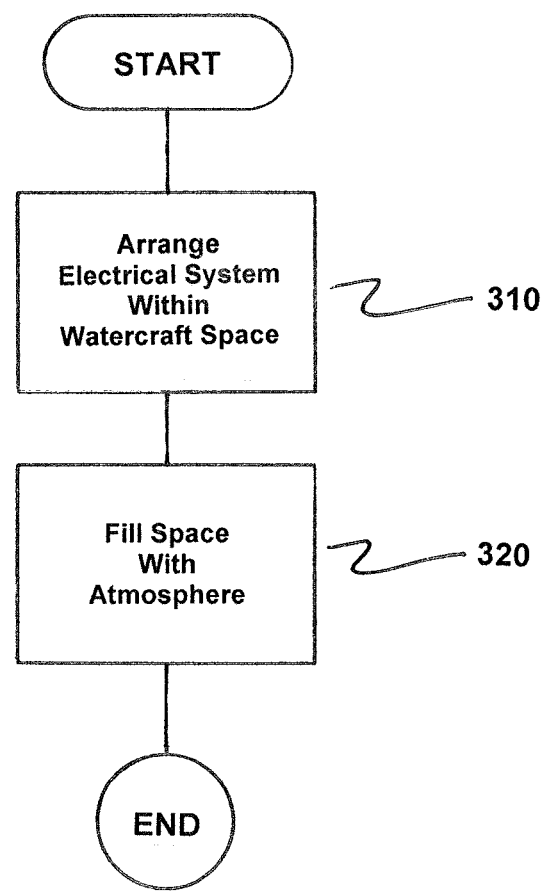
FIG. 3 is a flowchart of the method in accordance with the invention.

FIG. 3 is flowchart of the method for operating a watercraft 1, 2. The method comprise arranging an electrical system 3, 4, 5, 6, 7, 15, 21, 22 within a space of the watercraft 1, 2, as indicated in step 310. Next, the space 8, 18 is filled with an atmosphere 20, as indicated in step 320.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/ore method steps which perform substantially the same function in substantially the same way to achieve the same results are within the scope of the invention. Moreover, it should be recognized that structures method steps and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A propeller driven watercraft comprising:
    an unencapsulated electrical system including at least one of (i) a current converter, (ii) an electrical motor and (iii) a power distribution network, said unencapsulated electrical system being arranged within a space formed by a pressurized outer body of the propeller driven watercraft;
    wherein the space comprises an atmosphere different from air, said atmosphere comprising a power fuel.

2. The watercraft as claimed in claim 1, wherein the atmosphere has a low-reaction gas.

3. The watercraft as claimed in claim 1, wherein the space has an overpressure.

4. The watercraft as claimed in claim 1, wherein the space is flushed predominantly with the atmosphere.

5. The watercraft as claimed in claim 1, wherein the watercraft is a submarine.

6. The watercraft as claimed in claim 1, wherein the watercraft is an unmanned submarine.

7. A method for operating a propeller driven watercraft, comprising:
    arranging an unencapsulated electrical system within a space formed by a pressurized outer body of the propeller driven watercraft, said unencapsulated electrical system including at least one of (i) a current converter, (ii) an electrical motor and (iii) a power distribution network; and
    filling the space with an atmosphere having a power fuel;
    wherein the atmosphere of the watercraft having the power fuel is different than air.

8. The method as claimed in claim 7, wherein a pressure greater than air pressure is produced in the space.

9. The method as claimed in claim 8, wherein the pressure has a dependency on an immersion depth.

10. The method as claimed in claim 7, wherein the atmosphere having the power fuel forms a motor fuel.

11. The method as claimed in claim 7, wherein the space is cleared of all people before being filled with the atmosphere having the power fuel.

\* \* \* \* \*